United States Patent [19]

Theysohn et al.

[11] 4,092,284

[45] May 30, 1978

[54] FLAMEPROOF NYLON MOLDING COMPOSITIONS

[75] Inventors: Rainer Theysohn, Ludwigshafen; Rolf Wurmb, Heidelberg; Wolfgang Seydl, Frankenthal; Franz Zahradnik, Ludwigshafen, all of Germany

[73] Assignee: BASF Aktiengesellschaft, Ludwigshafen, Germany

[21] Appl. No.: 731,126

[22] Filed: Oct. 12, 1976

[30] Foreign Application Priority Data

Nov. 18, 1975  Germany .............................. 2551718

[51] Int. Cl.² ............................................ C08L 91/00
[52] U.S. Cl. ................................. 260/28 R; 260/37 N
[58] Field of Search ............... 260/37 N, DIG. 24, 28

[56] References Cited

U.S. PATENT DOCUMENTS

| 3,806,488 | 4/1974 | Stone et al. ........................ 260/37 N |
| 3,882,076 | 5/1975 | Largman et al. ................... 260/37 N |
| 3,951,908 | 4/1976 | Kaiser et al. ................ 260/DIG. 24 |
| 3,988,287 | 10/1976 | Inokuchi et al. .................. 260/37 N |

*Primary Examiner*—Lewis T. Jacobs
*Attorney, Agent, or Firm*—Keil, Thompson & Shurtleff

[57] ABSTRACT

Filled nylon molding compositions of increased rigidity containing red phosphorus as a flameproofing agent and talc or mica as a filler. They may be converted to moldings which are used, above all, in the electrical industry.

3 Claims, No Drawings

FLAMEPROOF NYLON MOLDING COMPOSITIONS

The present invention relates to the use of red phosphorus for flameproofing filled nylon molding compositions having increased rigidity and isotropic shrinkage.

It is known that the mechanical properties of nylon molding compositions, in particular the rigidity, can be improved substantially by adding, for example, glass fibers. However, this has an adverse effect on the flammability of the molding compositions, so that in order to achieve adequate flameproofing, for example by adding halogen compounds, substantially more flameproofing agent is needed than in the case of non-reinforced nylon. However, German Published Application DAS No. 19 31 387 discloses that if red phosphorus is used as the flameproofing agent in glass fiber-reinforced nylon, an excellent flameproofing action is achievable even by adding relatively small amounts of red phosphorus.

However, such flameproofed glass fiber-reinforced nylons have the disadvantage that because of the tendency of the glass fibers to undergo orientation during injection molding the finished articles obtained exhibit anisotropic shrinkage, which, bearing in mind the ability of nylons subsequently to absorb water, restricts the use of the materials for articles of high dimensional accuracy.

It is an object of the present invention to provide a flameproofed nylon of increased rigidity which, on exposure to a flame, does not drip flaming particles, and which exhibits isotropic shrinkage and shows no distortion.

We have found, surprisingly, that this object is achieved by the use of nylons which contain talc or mica as mineral fillers and a relatively small amount of red phosphorus, and that the latter can produce an excellent flameproofing effect without the need for fibrous reinforcing materials, eg. E-glass fibers, to be present additionally. Furthermore, such filled molding compositions exhibit isotropic shrinkage. The addition of the lamellar silicates furthermore has an advantageous effect on the mechanical properties of the molding compositions. Thus, above all, the achievable rigidity corresponds roughly to that of molding compositions appropriately reinforced with glass fibers. This is of particular advantage when the materials are used in the electrical industry, where not only accuracy of size and dimensional stability, but also high rigidity, of moldings is required. Futhermore, above all when using talc, the silicates are found to have a beneficial effect on the stability of the red phosphorus in the nylon. Thus, for example, the amounts of phosphine and phosphoric acids — occasionally formed, under unfavorable conditions, as reaction products of red phosphorus — are significantly reduced compared to those encountered with glass fiber-reinforced nylon.

Accordingly, the present invention relates to flameproofed thermoplastic molding compositions comprising:
1. a thermoplastic nylon,
2. red phosphorus as a flameproofing agent and
3. talc or mica as a filler.

A feature common to the fillers used is that they have a lamellar structure. In general, they are employed in amounts of from 10 to 50% by weight, preferably from 20 to 40% by weight, based on the weight of the molding composition. They can, if appropriate, be finished with an adhesion promoter, a wetting agent or a coating similar to a glass fiber size. The particle size of the fillers used is in general less than 50$\mu$ and preferably less than 10$\mu$. In the case of mica as the filler, the flake diameter should preferably be from $5 \times 10^{-3}$ to 2 mm and the side ratio, defined as the ratio of the diameter of the flakes to their thickness, should preferably be from 20:1 to 200:1.

The materials may be employed as powders, but also in a compacted form, if appropriate with additives which may be required for compacting.

The red phosphorus required for the flameproofing is suitably used in amounts of from 0.5 to 12% by weight, preferably from 2 to 8% by weight, based on the total amount of the molding composition. It is possible to use commercial technical grades of phosphorus, or concentrates of phosphorus in caprolactam, ester wax or nylon, the concentrates containing from 20 to 90% of red phosphorus. The red phosphorus may contain up to 30% by weight, based on phosphorus, of metal oxides, metal salts or organic complex-forming agents, as stabilizing additives. The mean size of the phosphorus particles distributed in the filled nylon should preferably correspond to a diameter of from 0.0001 to 0.5 mm, preferably from 0.001 to 0.2 mm.

Nylons which may be used for the purposes of the invention are nylon-6, nylon-6,6 and nylon-6,10, as well as nylon copolymers, and mixtures of these nylons. The K value of the nylons (measured by the method of H. Fikentscher, Cellulosechemie 13 (1932), 58, at 25° C, at a concentration of 0.5 g in 100 ml of 98% strength sulfuric acid) should preferably be from 60 to 85, preferably from 65 to 75. In addition to the additives listed, the molding compositions of the invention may also contain conventional stabilizers, processing assistants, lubricants, dyes and pigments. The additives may be incorporated into the nylon by means of conventional equipment, eg. extruders, mills or kneaders. At times, it is advantageous first to mix the additives with some of the plastic and then to incorporate them into the main amount of the plastic.

EXAMPLES

Nylon 6,6 having a K value of 72 was fused in a twin screw extruder at 280° C. The fillers and red phosphorus, in the form of a 30% strength by weight concentrate in nylon-6,6, were introduced through a downstream orifice, as described in U.S. Pat. No. 3,304,282 or in "Kunststoffe" 49 (1959), 543. The amounts used are shown in Table 1. The percentages mentioned are by weight. The mixture was extruded through dies, drawn off as strands and granulated after cooling.

To examine the flammability, test specimens of size $1.5 \times 13 \times 130$ mm were produced by injection molding of the dried granules. The flammability was tested by a method based on Unterwriters' Laboratories method No. 94, the vertically suspended test specimens being flamed with a Bunsen burner flame for 10 seconds.

The rigidity of the samples was determined by measuring the tensile modulus of elasticity in accordance with DIN 53,455.

In order to measure the directional (anisotropic) shrinkage, box-like test specimens were injection molded. The deviation from the intended size, in the lengthwise and crosswise direction, was determined both immediately after injection molding and again after conditioning.

The results are summarized in Table 2.

TABLE 1

| Experiment 1: | 60% of nylon-6,6. |
| --- | --- |
| | 10% of a concentrate of red phosphorus in nylon-6,6. |
| | 30% of talc. |
| Experiment 2: | 60% of nylon-6,6. |
| | 10% of a concentrate of red phosphorus in nylon-6,6. |
| | 30% of mica. |

TABLE 2

| Experiment | Burning characteristics | Tensile modulus of elasticity [Nmm$^{-2}$] | Shrinkage/ distortion |
| --- | --- | --- | --- |
| 1 | Self-extinguishes without dripping flaming particles | 10,500 | Isotropic |
| 2 | Self-extinguishes without dripping flaming particles | 11,200 | Almost isotropic |

It may be seen from the table that moldings having an advantageous combination of non-flammability, rigidity and shrinkage properties are obtainable from the molding compositions of the invention.

We claim:

1. A flameproofed thermoplastic molding composition which comprises
   (a) a thermoplastic nylon,
   (b) red phosphorus and
   (c) talc as a filler, wherein said molding composition contains from about 0.5 to 12% by weight of red phosphorus and from about 10 to 50% by weight of filler, the amounts by weight being based on the total molding composition.

2. A molding composition as claimed in claim 1, wherein the red phosphorus is used as a powder or as a concentrate in caprolactam or ester wax or nylon.

3. A molding composition as claimed in claim 1, wherein the filler has a particle size of less than 50 μ.